UNITED STATES PATENT OFFICE.

FREDERICK F. HUNT, OF NEW YORK, N. Y.

PROCESS OF PRODUCING PIGMENTS.

1,183,201.   Specification of Letters Patent.   Patented May 16, 1916.

No Drawing.   Application filed June 2, 1911.   Serial No. 630,859.

*To all whom it may concern:*

Be it known that I, FREDERICK F. HUNT, a citizen of Canada, residing at New York, in the county of New York and State of New York, have invented certain new and useful Improvements in Processes of Producing Pigments, of which the following is a specification.

This invention relates to process of producing pigments; and it comprises a process of producing a compound white pigment wherein a water solution of sulfate of zinc is heated with a substantially chemically equivalent quantity of a carbonate of a base capable of forming an insoluble sulfate, calcium carbonate being particularly advantageous for the present purposes and such calcium carbonate being best in a precipitated and fresh or "unaged" form, until reaction is complete, the resulting co-precipitated bodies are removed, separated from the water, dried, calcined and quenched in water; and it also comprises as a new composition of matter a pigment comprising co-precipitated, uniformly intermingled calcium sulfate or other insoluble sulfate and zinc oxid, said pigment being an impalpable white powder of good covering properties and requiring but little oil to convert it into paint; all as more fully hereinafter set forth and as claimed.

The value of a pigment for painting purposes depends practically entirely upon its opacity, fineness of sub-division and its relations to linseed oil and similar vehicles; that is, its power of forming emulsion-like suspensions with such vehicles. In all these properties, white lead, that is, a lead carbonate, when produced by one special process (the "Dutch process") is indisputably preëminent among white pigments. Lead carbonates of the same centesimal composition but produced by other processes and, consequently, in a different physical state, are not nearly so valuable.

It is the object of the present invention to produce a white pigment from cheaper materials and by a cheaper process which shall be equivalent, or nearly equivalent, to white lead in these properties, having great opacity, great fineness and great power of entering into the chemico-physical combination with linseed oil and similar vehicles which is necessary in a paint pigment.

Calcium sulfate is a well-known white body but it is not considered of great value for painting purposes in the forms in which it usually occurs. Even in the precipitated form, as "pearl hardening", it is deficient in the properties necessary for a valuable white pigment for painting purposes. Zinc oxid is another commercial white pigment of better properties.

I have discovered that I can produce a white pigment having the desired physical properties in a high degree by a process which involves the co-precipitation of calcium sulfate with an insoluble zinc compound by reaction of zinc sulfate, calcium carbonate and water. As so precipitated, the compound pigment is very fine in texture, is opaque and has very good properties as regards incorporation in paint vehicles.

In performing my process I may employ ordinary commercial zinc sulfate, or, where a pure white pigment is desired, I may use a purified zinc sulfate. Ordinary commercial zinc sulfate, otherwise known as "zinc vitriol" or "white vitriol," may contain as impurities more or less iron, copper and nickel. Iron gives a creamy tinge to the finished pigment, while copper and nickel produce grayish casts. For some purposes these shades are often unobjectionable, as where the pigment is to be used with deep colored pigments, and commercial zinc sulfate is perfectly satisfactory as a raw material in such cases. Some grades of commercial zinc sulfate are however sufficiently pure to give good white pigments directly. With impure zinc sulfate, or zinc sulfate solutions, where a pure white pigment is desired purification by appropriate methods should be resorted to. One convenient method is to treat a water solution of such zinc sulfate with metallic zinc whereby the copper is removed, and then add a small quantity of an oxidizing agent such as bleaching powder solution to peroxidize iron, etc. Upon treating the solution with zinc oxid, iron and nickel are both precipitated as hydrated oxids, leaving a substantially pure zinc sulfate solution. This treatment also removes cadmium and manganese. The solution may be saturated or it may be less strong. Differences in concentration produce certain differences in the character of the subsequent product; but all strengths of solution give useful products. The solution of zinc sulfate, however prepared, I heat, if not already hot, and then add the amount of calcium carbonate equivalent to the amount of sulfate of zinc present. It is best to use precipitated, comparatively fresh or "unaged" calcium carbonate, since ground limestone or marble, though usable, are less reactive. It is best to keep the mixture at a boiling temperature until all reaction finishes. By double decomposition, sulfate of calcium and carbonate (which, under the circumstances, becomes largely hydrated oxid) of zinc are formed; these bodies, which are both relatively insoluble, being co-precipitated to form a compound precipitate which is very fine and opaque. With proper proportioning of the materials and with proper operation, no sulfate of zinc is left in solution, neither is any of the comparatively coarse and granular carbonate of calcium employed left in the pigment. The reaction will be complete. Of course an excess of either reagent may be employed, but the most satisfactory results are obtained where substantially chemically equivalent quantities are present.

The water is now separated from the precipitated pigment and the pigment dried. There being no solutes left in the water left adhering to the pigment, with proper proportioning, washing of the precipitate is not necessary. Drying may be by any of the commercial methods or apparatus. The dried material is next heated to a good red heat until anhydrous and then quenched in water. Any means of heating may be adopted, as for instance muffle heating or direct heating by gas or oil flame in a reverbatory. Grate firing is less suitable because of the possibility of contamination by flying ash. Neither component of the compound pigment is very sensitive to reducing flames; but oxidizing heating should nevertheless be employed when using flame heat. Muffle heating is ordinarily better than direct flame heat. The material after quenching and drying is suitable for direct use though, if desired, it may be reground.

The pigment is a fine, white opaque powder readily miscible with linseed oil, wood oil, turpentine, etc., to form paints. In admixture with a suitable paint vehicle it forms a paint of great opacity and covering power, appearing to enter into a chemico-physical union with the vehicle similar to that occurring with white lead and oil. The pigment and paint may of course be admixed with other pigments or paints, as in producing different colors. The pigment may also be used for other purposes, as for instance as a paper filler; as a filling for celluloid and other plastics; as a rubber filler; etc.

Instead of calcium carbonate, I may of course make use of the carbonates of other bases capable of forming insoluble sulfates, for example alkaline earth carbonates such as barium and strontium carbonates. But these do not yield as satisfactory results for most purposes as does calcium carbonate.

What I claim is:—

1. The process of producing pigments which comprises adding water to zinc sulfate to dissolve the same, adding an amount of calcium carbonate corresponding to the zinc sulfate and heating the liquid until the calcium carbonate is converted into calcium sulfate in admixture with an insoluble zinc compound.

2. The process of producing pigments, which comprises adding water to zinc sulfate to dissolve the same, treating the water solution of zinc sulfate with calcium carbonate to obtain a precipitated mixture of calcium sulfate and a substantially insoluble zinc compound.

3. The process of producing pigments, which comprises treating a water solution of zinc sulfate with freshly precipitated calcium carbonate to obtain a precipitated mixture of calcium sulfate and a substantially insoluble zinc compound.

4. The process of producing pigments, which comprises treating a hot solution of zinc sulfate containing water in excess of the amount corresponding to the water of crystallization of zinc sulfate with calcium carbonate, removing the precipitate formed from the liquid, and drying said precipitate.

5. The process of producing pigments, which comprises adding freshly precipitated calcium carbonate to a hot solution of zinc sulfate, heating the solution until action ceases, removing and drying the precipitate formed, and furnacing the dried product.

6. The process of producing pigments, which comprises adding freshly precipitated calcium carbonate to a hot solution of zinc sulfate, heating the solution until action ceases, removing and drying the precipitate formed, furnacing the dried product, and quenching the hot furnaced pigment.

7. The process of producing pigments, which comprises adding water to zinc sulfate to dissolve the same, treating the hot solution of zinc sulfate with a substantially equivalent quantity of powdered calcium carbonate, separating the precipitate formed from the supernatant liquid, and furnacing the separated precipitate to produce a finished pigment comprising zinc oxid and calcium sulfate.

8. The process of producing pigments, which comprises reacting between chemically equivalent quantities of zinc sulfate and calcium carbonate in the presence of water, said water being present in amount greater than corresponds to the water of crystallization of said zinc sulfate, removing from the water, and treating the resulting product to produce a useful pigment.

9. The process of producing pigments, which comprises adding water to zinc sulfate to dissolve the same, treating the water solution of zinc sulfate with the carbonate of a base capable of forming an insoluble sulfate until the precipitatory reactions
5 cease to produce a co-precipitated mixture having valuable pigmentary properties.

In testimony whereof, I affix my signature in the presence of two subscribing witnesses.

FREDERICK F. HUNT.

Witnesses:
 ALEX. G. WHYTE,
 J. L. THOMSON.